(12) United States Patent
Huang et al.

(10) Patent No.: US 11,378,560 B2
(45) Date of Patent: Jul. 5, 2022

(54) MASS SPECTRUM DATA ACQUISITION AND ANALYSIS METHOD

(71) Applicant: SHIMADZU CORPORATION, Kyoto (JP)

(72) Inventors: Yunqing Huang, Shanghai (CN); Wenjian Sun, Shanghai (CN); Xiaoqiang Zhang, Shanghai (CN)

(73) Assignee: SHIMADZU CORPORATION, Kyoto (JP)

( * ) Notice: Subject to any disclaimer, the term of this patent is extended or adjusted under 35 U.S.C. 154(b) by 176 days.

(21) Appl. No.: 16/645,902

(22) PCT Filed: Nov. 14, 2018

(86) PCT No.: PCT/JP2018/042171
§ 371 (c)(1),
(2) Date: Mar. 10, 2020

(87) PCT Pub. No.: WO2019/102919
PCT Pub. Date: May 31, 2019

(65) Prior Publication Data
US 2020/0278330 A1     Sep. 3, 2020

(30) Foreign Application Priority Data

Nov. 23, 2017  (CN) .......................... 201711181753.7

(51) Int. Cl.
*G01N 30/86* (2006.01)
*G01N 30/72* (2006.01)
*H01J 49/00* (2006.01)

(52) U.S. Cl.
CPC ..... *G01N 30/8651* (2013.01); *G01N 30/7233* (2013.01); *G01N 30/8637* (2013.01); *H01J 49/0036* (2013.01)

(58) Field of Classification Search
CPC ........... G01N 30/8651; G01N 30/7233; G01N 30/8637; H01J 49/0036; H01J 49/0045; H01J 49/0031
See application file for complete search history.

(56) References Cited

U.S. PATENT DOCUMENTS 6,717,130 B2    4/2004   Bateman et al.
8,809,770 B2    8/2014   Bonner et al.
(Continued)

FOREIGN PATENT DOCUMENTS

CN    102043011 A    5/2011
CN    103109345 A    5/2013
(Continued)

OTHER PUBLICATIONS

JPO, "First Office Action for Japanese Application No. 2020-513369", Japan, dated Apr. 23, 2021.
(Continued)

*Primary Examiner* — David A Vanore
(74) *Attorney, Agent, or Firm* — Tim Tingkang Xia, Esq.; Locke Lord LLP

(57) ABSTRACT

A data acquisition and analysis method for a mass spectrometer includes providing at least one ion source for generating ions, the generated ions containing ions of a substance to be analyzed; dividing the full mass-to-charge ratio range of the ions of the substance into several mass-to-charge ratio windows, feeding ions corresponding to different mass-to-charge ratio windows into a collision cell to fragment at least part of the corresponding ions, and recording mass spectra of the ions passing through the collision cell as corresponding product ion spectra; obtaining a mass-to-charge ratio window corresponding to the product ion spectra obtained by the searching; within the mass-to-charge ratio range of the obtained mass-to-charge ratio window, obtaining ion peaks from the product ion (Continued)

spectra obtained by the searching; and determining whether ions corresponding to the obtained ion peaks are precursor ions corresponding to the product ion spectra obtained by the searching.

14 Claims, 11 Drawing Sheets

(56) References Cited

U.S. PATENT DOCUMENTS

| | | | |
|---|---|---|---|
| 2002/0102610 A1* | 8/2002 | Townsend | G01N 33/6848 435/7.1 |
| 2004/0248234 A1* | 12/2004 | Cole | C12Q 1/26 435/25 |
| 2005/0006580 A1* | 1/2005 | Hager | H01J 49/0045 250/292 |
| 2005/0199804 A1* | 9/2005 | Hunt | H01J 49/0072 250/290 |
| 2006/0085142 A1* | 4/2006 | Mistrik | G01N 27/62 702/27 |
| 2006/0138320 A1* | 6/2006 | Bateman | H01J 49/34 250/288 |
| 2007/0023633 A1* | 2/2007 | Wang | H01J 49/02 250/282 |
| 2010/0187414 A1* | 7/2010 | Gorenstein | H01J 49/022 250/282 |
| 2010/0301205 A1* | 12/2010 | Thomson | H01J 49/0027 250/283 |
| 2012/0158318 A1* | 6/2012 | Wright | H01J 49/0036 702/28 |
| 2012/0261568 A1* | 10/2012 | Coon | H01J 49/004 250/282 |
| 2014/0138537 A1* | 5/2014 | Grothe, Jr. | G16C 20/90 250/282 |
| 2014/0142865 A1* | 5/2014 | Wright | H01J 49/0036 702/23 |
| 2015/0162175 A1* | 6/2015 | Wright | H01J 49/0027 250/282 |
| 2016/0268112 A1* | 9/2016 | Yip | G01N 33/6851 |
| 2017/0328874 A1* | 11/2017 | Yamamoto | G01N 30/72 |
| 2018/0144918 A1* | 5/2018 | Geromanos | G16B 20/00 |
| 2018/0350578 A1* | 12/2018 | Yip | H01J 49/0031 |

FOREIGN PATENT DOCUMENTS

| | | |
|---|---|---|
| CN | 107210181 A | 9/2017 |
| JP | 2008536263 A | 9/2008 |
| JP | 2012506709 A | 3/2012 |
| JP | 2013537312 A | 9/2013 |
| WO | 2006103448 A2 | 10/2006 |
| WO | 2010049156 A1 | 5/2010 |
| WO | 2010129187 A1 | 11/2010 |
| WO | 2012035412 A2 | 3/2012 |
| WO | 2013093114 A2 | 6/2013 |
| WO | 2016125061 A1 | 8/2016 |

OTHER PUBLICATIONS

SIPO, "Second Chinese Office Action for Chinese Application No. 201711181753.7", China, dated Mar. 10, 2021.

Ducret, Axel et al., "High throughput protein characterization by automated reverse-phase chromatography/electrospray tandem mass spectrometry", Protein Science, 1998, pp. 706-719, vol. 7.

Wilson, Johnathan et al., "Multiplexed MS/MS in a Quadrupole Ion Trap Mass Spectrometer", Anal. Chem., 2004, pp. 7346-7353, vol. 76, No. 24.

Li, Yuanyue et al., "Group-DIA: analyzing multiple data-independent acquisition mass spectrometry data files", Nature Methods, Dec. 2015, pp. 1105-1106, vol. 12, No. 12.

EPO (ISR/EP), "International Search Report and Written Opinion for PCT Application No. PCT/JP2018/042171", NL, dated Feb. 19, 2019.

SIPO, "First Chinese Office Action for Chinese Application No. 201711181753.7", China, dated Sep. 3, 2020.

\* cited by examiner

MASS SPECTRUM DATA ACQUISITION AND ANALYSIS METHOD

TECHNICAL FIELD

The present invention relates to the field of mass spectrum data acquisition, and in particular to a mass spectrum data acquisition and analysis method which has high qualitative accuracy and can perform quantitative analysis by using an ion current chromatogram of product ions.

BACKGROUND ART

Due to their characteristics of high sensitivity and good selectivity, mass spectrometers have been widely applied to the analysis of complex samples. Particularly, since soft ionization techniques represented by electrospray ionization were invented, mass spectrometers have been more widely applied in the analysis of organic matters.

Common organic matters, which can be analyzed qualitatively and quantitatively by mass spectrometers, include proteins, polypeptides, metabolites, medicines, narcotic drugs, pesticides and the like. Since complex samples contain a huge number of substances, high-resolution mass spectrometers with a higher parsing capability and tandem mass spectrometers have been increasingly applied.

With the advantages of both the high-resolution mass spectrometry and the tandem mass spectrometry, the high-resolution tandem mass spectrometry technology has the highest parsing capability among all mass spectrometers. For example, during the LC-MS analysis, an ion current chromatogram of product ions has a higher signal-to-noise ratio and better impurity interference resistance, and a product ion spectrum can provide effective reference information for the structural analysis of an analyte. At present, common high-resolution tandem mass spectrometry include tandem Quadrupole Time-Of-Flight (QTOF) mass spectrometry, tandem Ion-Trap Time-Of-Flight (IT-TOF) mass spectrometry, tandem quadrupole orbitrap mass spectrometry, tandem ion trap orbitrap mass spectrometry and the like.

Omics analysis may greatly enhance the understanding of the operating principle of living entities, and thus facilitate the development of new medical schemes and new medicines. At present, the omics analysis mainly include genomic analysis, proteomic analysis and metabolomic analysis, where the genome analysis mainly depends upon a gene sequencing method, and both the proteome analysis and the metabolome analysis depend upon a mass spectrometry with a high parsing capability.

Although a rapid progress has been achieved in the resolution of the mass spectrometers and in the tandem mass spectrometry, the mass spectrometers are still unable to overcome all difficulties when facing a huge number of substances in the omics analysis. For the complex samples, it is very important to improve data acquisition strategies for the mass spectrometers. In order to increase the coverage of polypeptides and the data dependency in the proteome analysis, Ducret et al. proposed a data-dependent acquisition scheme in 1998 (Protein Sci. 1998, 7 (3), 706-719). This scheme includes the following steps: 1) a preceding-stage mass analyzer of a tandem quadrupole time-of-flight mass spectrometer does not perform quality selection, and the time-of-flight mass spectrometer scans precursor ions within the concerned mass-to-charge ratio section when a collision cell operates in a low fragmentation energy mode; 2) according to the precursor ion information measured in the precursor ion scanning step, mass-to-charge ratio channels for several precursor ions with the highest abundance are identified as candidate ion mass-to-charge ratio channels; precursor ions in one mass-to-charge ratio channel are selected by a quadrupole mass analyzer in the front of the collision cell every time and then fed into the collision cell; when the collision cell operates in a high fragmentation energy mode, the precursor ions are fragmented, and a mass spectrum of the generated product ions is recorded by a time-of-flight mass analyzer; and the complete monitoring of the plurality of candidate ion mass-to-charge ratio channels requires many times of fragmentation and product ion scanning; and, (3) one precursor ion scanning event and several product ion scanning steps form one cycle, and a next cycle will be performed after one cycle ends.

This data-dependent acquisition method solves the problem of low coverage of the analyte during the tandem mass spectrometry to a certain extent. However, since the product ion information of only one precursor ion mass-to-charge ratio channel can be monitored by one product ion scanning, the utilization rate and throughput of the precursor ions are low during the tandem mass spectrometry analysis. When a large number of analytes flow out from a chromatographic column, many precursor ions with a low abundance are still not monitored. Meanwhile, since the mass-to-charge ratio channels of the precursor ions corresponding to the product ion scanning steps in each cycle change constantly, it cannot be ensured that the product ions of the analytes are uniformly detected for multiple times within the chromatographic elution time, and quantitative analysis can only be performed by using an ion current chromatogram of the precursor ions of the analytes rather than an ion current chromatogram of the product ions, thus influencing the selectivity and precision of the quantitative analysis in the omics analysis.

The data-independent acquisition strategy proposed by Wilson et al. (Analytical Chemistry 2004, 76 (24), 7346-7353) well solves the difficulty that an ion current chromatogram of product ions cannot be used for quantitative analysis. The data-independent acquisition method is implemented in an ion trap in the initial stage, while this method is mainly used in the omics analysis using a tandem quadrupole time-of-flight mass spectrometer as a platform in the later stage (Nat Meth 2015, (12), 1105-1106). In the data-independent acquisition strategy, the full mass-to-charge ratio range of precursor ions is evenly divided into several mass-to-charge ratio windows each having a width of 10 to 30 amu, and precursor ion fragmentation and product ion scanning are successively performed for each mass-to-charge ratio window. One scanning cycle includes several times of the product ion scanning. After one cycle ends, the process proceeds to a next cycle until the chromatographic separation is completed. Then, AB Sciex Corporation proposed a data-independent acquisition method called SWATH (U.S. Pat. No. 8,809,770), and this data-independent acquisition method has been used in commercial applications. In the SWATH method, the mass spectrum data acquisition part is similar to the method proposed by Wilson et al., but the data analysis part is different. Since the mass spectrum obtained by the data-independent acquisition is a mixed spectrum of multiple substances, it is very difficult to qualitatively analyze a complex sample by directly using the mixed spectrum. In the SWATH method, instead of qualitative analysis, depending on the spectra in a spectrum library of analytes, it is firstly determined whether a certain analyte is detected and targeted quantitative analysis is then performed. In the SWATH method, due to the absence of accurate mass information about the precursor ions, the accuracy of the qualitative analysis of the target analyte will be adversely affected. Further, as a targeted data analysis method, the SWATH method can only be used to analyze a target object containing a product ion mass spectrum. As a result, the range of application is limited obviously. The data-independent acquisition method represented by an MSE method proposed by Waters Corporation (U.S. Pat. No. 6,717,130) is a non-targeted method. In this method, one scanning cycle includes product ion scanning and one precursor ion scanning. At the end of the data acquisition, deconvolution is performed in virtue of the similarities in chromatographic peak profile and retention time, and the precursor ions obtained in the precursor ion scanning are associated with the product ions obtained in the product ion scanning to obtain a product ion mass spectrum of an individual substance. The subsequent qualitative and quantitative analysis depends on the product ion mass spectrum obtained by deconvolution. Such methods highly depend on the effectiveness of the deconvolution. However, the effectiveness of the deconvolution is very sensitive to the stability of the mass spectrometer, the content of the sample and the complexity of the sample. Consequently, the repeatability and effectiveness of the analysis will be affected significantly.

CITATION LIST

Patent Literature

PTL 1: U.S. Pat. No. 8,809,770
PTL 2: U.S. Pat. No. 6,717,130

Non Patent Literature

NPL 1: Ducret et al., Protein Sci. 1998, 7 (3), 706-719
NPL 2: Wilson et al., Analytical Chemistry 2004, 76 (24), 7346-7353
NPL 3: Nat Meth 2015, (12), 1105-1106

SUMMARY OF INVENTION

Technical Problem

In view of the defects in the prior art, an objective of the present invention is to provide a novel mass spectrum data acquisition and analysis method in order to solve the problems in the prior art.

Solution to Problem

To achieve this objective and other related objectives, the present invention provides a data acquisition and analysis method for a mass spectrometer, including steps of: a. providing at least one ion source for generating ions, the generated ions containing ions of a substance to be analyzed; b. dividing the full mass-to-charge ratio range of the ions of the substance to be analyzed into several mass-to-charge ratio windows, respectively feeding ions corresponding to different mass-to-charge ratio windows into a collision cell to fragment at least part of the corresponding ions, and recording mass spectra of the ions passing through the collision cell as corresponding product ion spectra; c. repeating the step b for several times; d. searching for the obtained product ion spectra by following steps d1 to d3 to determine precursor ions corresponding to the product ion spectra: d1: obtaining a mass-to-charge ratio window corresponding to the product ion spectra obtained by the searching; d2: within the mass-to-charge ratio range of the obtained mass-to-charge ratio window, obtaining ion peaks from the product ion spectra obtained by the searching; and, d3: determining whether ions corresponding to the obtained ion peaks are precursor ions corresponding to the product ion spectra obtained by the searching.

In an embodiment of the present invention, when the width of the mass-to-charge ratio window is less than 17 amu and when the number of charges carried by the ions corresponding to the ion peaks is 1, the ions corresponding to the obtained ion peaks are all regarded as precursor ions.

In an embodiment of the present invention, the step d3 includes: performing charge deconvolution on the ion peaks to obtain the mass of the ions corresponding to the ion peaks; calculating a difference in mass between the ions corresponding to the ion peaks, and determining, based on the difference in mass, whether ions having a mass less than a first threshold are generated from ions having a mass greater than a second threshold due to neutral loss; and, removing the ions generated by the neutral loss, and using the remaining ions as precursor ions corresponding to the product ion spectrum.

In an embodiment of the present invention, when the width of the obtained mass-to-charge ratio window is greater than 17 amu but less than 26 amu and when the number of charges carried by the ions corresponding to the ion peaks in the obtained mass-to-charge ratio window is 1, molecular fragments corresponding to the neutral loss to be determined are $H_2O$ and $NH_3$.

In an embodiment of the present invention, in the step of dividing the full mass-to-charge ratio range of the ions of the substance to be analyzed into several mass-to-charge ratio windows, the width of the several mass-to-charge ratio windows is variable or constant within the full mass-to-charge ratio range.

In an embodiment of the present invention, the method further includes the following step of searching for, according to the mass-to-charge ratio of the obtained precursor ions, a corresponding substance in a preset database.

In an embodiment of the present invention, the method further includes the following steps of calculating, according to the mass-to-charge ratio of the obtained precursor ions and an isotopic abundance ratio of the precursor ions, a molecular formula of the precursor ions; and, searching for, according to the calculated molecular formula, a corresponding substance in a preset database.

In an embodiment of the present invention, the preset database is generated by chromatography-mass spectrometry analysis performed in advance.

In an embodiment of the present invention, the product ion spectrum of the corresponding substance in the preset database is obtained by theoretical calculation.

In an embodiment of the present invention, the method further includes the following step of calculating, according to a reference product ion spectrum of the corresponding substance in the preset database and the product ion spectrum recorded by a mass spectrometer, a score for further determining whether the corresponding substance is detected.

In an embodiment of the present invention, the method further includes the following steps of: if it is determined that the corresponding substance is detected, generating a time-dependent ion current chromatogram according to product ions in the reference product ion spectrum; obtaining chromatographic peaks of product ions of the corresponding substance in the ion current chromatogram; and, comparing profiles of the chromatographic peaks of the product ions, and selecting, for quantitative analysis, a chromatographic peak which has a difference less than a third threshold in retention time and peak width, a peak symmetry higher than a fourth threshold, and an intensity of the chromatographic peaks consistent with the intensity of mass spectral peaks in the product ion spectrum of the corresponding substance.

In an embodiment of the present invention, the method further includes the following steps of: generating a time-dependent ion current chromatogram according to product ions in the product ion spectrum of the corresponding substance in the preset database; obtaining chromatographic peaks of product ions of the corresponding substance in the ion current chromatogram; and, comparing profiles of the product ion chromatographic peaks, the profiles including, but not limited to, retention time, peak width, peak symmetry and peak intensity.

In an embodiment of the present invention, the method further includes the following step of calculating, according to the profiles of the chromatographic peaks of the product ions and the reference product ion spectrum of the corresponding substance in the preset database, a score for determining whether the corresponding substance is detected.

In an embodiment of the present invention, the method further includes the following step of: if it is determined that the corresponding substance is detected, selecting, for quantitative analysis, a chromatographic peak which has a difference less than a third threshold in retention time and peak width, a peak symmetry higher than a fourth threshold, and an intensity of the chromatographic peaks consistent with the intensity of mass spectral peaks in the product ion spectrum of the corresponding substance.

In an embodiment of the present invention, in one process of recording the product ion spectrum, the collision energy of the collision cell changes within a set range.

In an embodiment of the present invention, the change is a change from low to high or a change from high to low.

In an embodiment of the present invention, the several mass-to-charge ratio windows are continuously distributed and cover the full mass-to-charge ratio range of the ions of the substance to be analyzed.

In an embodiment of the present invention, there is an overlap of 1 amu between two adjacent mass-to-charge ratio windows.

To achieve this objective and other related objectives, the present invention provides a mass spectrum data acquisition and analysis method, including the following steps of: a. providing at least one ion source for generating ions, the generated ions containing ions of a substance to be analyzed; b. operating a collision cell in a low fragmenting energy mode, respectively feeding the ions of the substance to be analyzed within the full mass-to-charge ratio range into the collision cell to partially fragment or not fragment the ions, and respectively recording mass spectra of the ions passing through the collision cell as precursor ion spectra; c. operating the collision cell in a high fragmentation energy mode, dividing the full mass-to-charge ratio range of the ions of the substance to be analyzed into several mass-to-charge ratio windows, feeding ions corresponding to different mass-to-charge ratio windows into the collision cell to fragment at least part of the corresponding ions, and respectively recording mass spectra of the ions passing through the collision cell as corresponding product ion spectra; d. repeating the steps b and c for several times; f. searching for the obtained product ion spectrum by the following steps f1 to f3 to determine precursor ions corresponding to the product ion spectra: f1: obtaining mass-to-charge ratio windows corresponding to the product ion spectra obtained by the searching; f2: within the mass-to-charge ratio range of the obtained mass-to-charge ratio window, obtaining ion peaks from the product ion spectra obtained by the searching; and, f3: determining whether ions corresponding to the obtained ion peaks are precursor ions corresponding to the product ion spectra obtained by the searching.

In an embodiment of the present invention, the method further includes the following step of: searching for, according to the mass-to-charge ratio of the obtained precursor ions, a corresponding substance from a preset database.

In an embodiment of the present invention, the method further includes the following steps of calculating, according to the mass-to-charge ratio of the obtained precursor ions and an isotopic abundance ratio of the precursor ions, a molecular formula of the precursor ions; and, searching for, according to the calculated molecular formula, a corresponding substance from a preset database.

To achieve this objective and other related objectives, the present invention provides a mass spectrum data acquisition and analysis method, including the following steps of: a. providing at least one ion source for generating ions, the generated ions containing ions of a substance to be analyzed; b. dividing the full mass-to-charge ratio range of the ions of the substance to be analyzed into several mass-to-charge ratio windows, respectively feeding ions corresponding to different mass-to-charge ratio windows into a collision cell to fragment at least part of the corresponding ions, and respectively recording mass spectra of the ions passing through the collision cell as corresponding product ion spectra; c. by an ion channel parallel to the collision cell, allowing the ions of the substance to be analyzed to bypass the collision cell to reach a mass analyzer in rear of the collision cell, and recording mass spectra of the ions as precursor ion spectra, wherein the ions are not fragmented or partially fragmented in the parallel ion channel; d. repeating the steps b and c for several times; f. searching for the obtained product ion spectrum by the following steps to determine precursor ions corresponding to the product ion spectra: f1: obtaining a mass-to-charge ratio window corresponding to the product ion spectra obtained by the searching; f2: within the mass-to-charge ratio range of the obtained mass-to-charge ratio window, obtaining ion peaks from product ion spectra obtained by the searching; and, f3: determining whether ions corresponding to the obtained ion peaks are precursor ions corresponding to the product ion spectra obtained by the searching.

As described above, the data-independent acquisition and analysis method for a mass spectrometer of the present invention has the following beneficial effects: as a data-independent acquisition strategy, this method effectively improves the ion utilization efficiency of the mass spectrometer; and, compared with the conventional data-independent acquisition and analysis methods, this method has higher quantitative/qualitative analysis performance.

DESCRIPTION OF EMBODIMENTS

Figure 1:
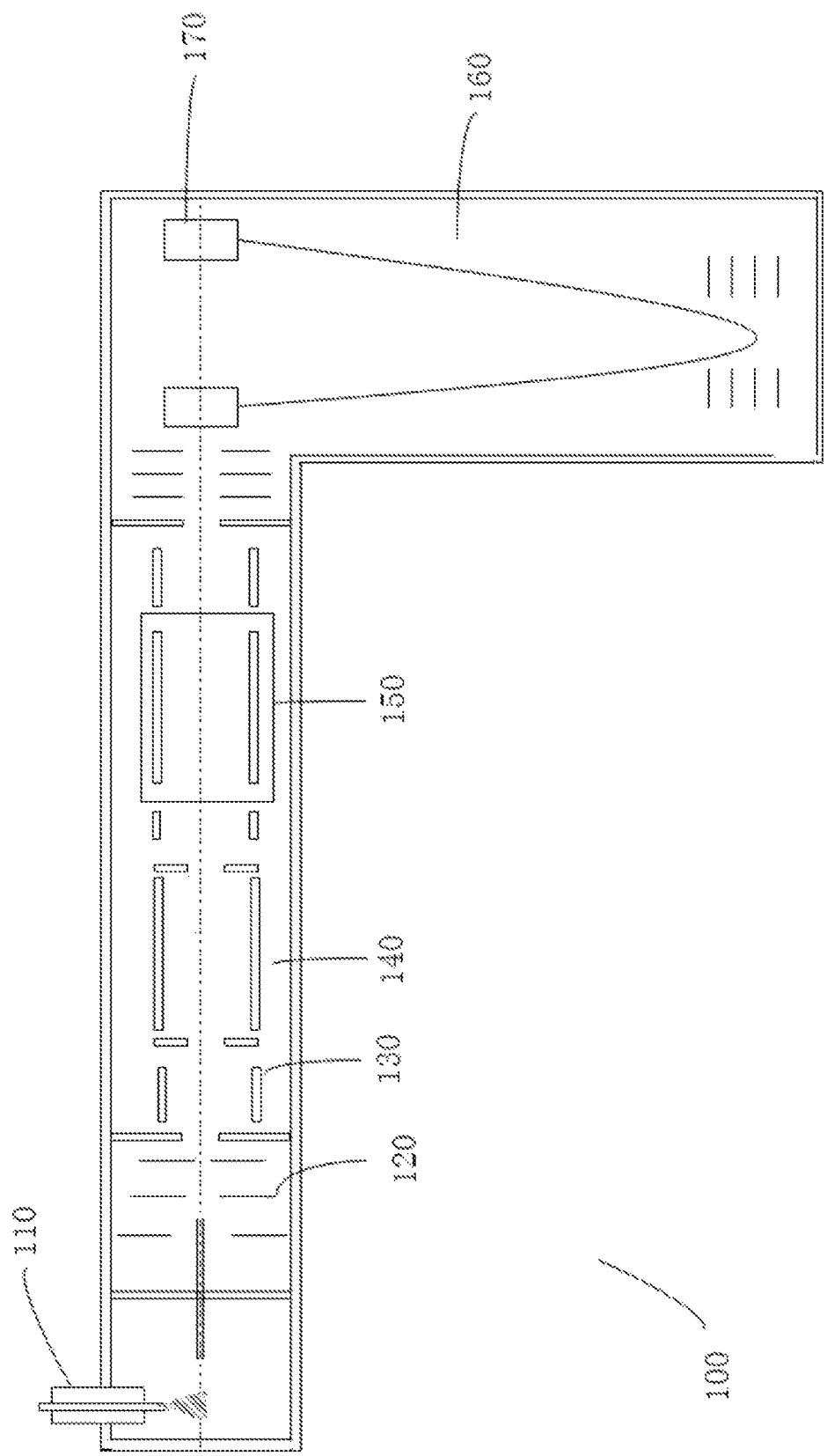
FIG. 1 shows a schematic structure diagram of a preferred mass spectrometer capable of implementing a mass spectrum data acquisition and analysis method according to the present invention.

Implementations of the present invention will be described below by specific embodiments, and other advantages and effects of the present invention may be easily understood by those skilled in the art from the contents disclosed in the specification. The present invention may also be implemented or applied by additional different specific implementations. The details in the specification may be based on different standpoints and applications, and various modifications or alterations may be made to the details without departing from the spirit of the present invention. It is to be noted that the following embodiments and the features in the embodiments may be combined if not conflict.

It is to be noted that, the drawings in the following embodiments are merely for illustratively describing the basic concept of the present invention. Therefore, only components involved in the present invention are shown in the drawings, and they are not drawn according to the number, shape and size of the components during actual implementations. Meanwhile, the shape, number and scale of the components may be changed arbitrarily during the actual implementations, and the layout form of the components may be more complicated.

An objective of the present invention is to provide a novel mass spectrum data acquisition and analysis method in order to significantly improve the ion utilization efficiency and quantitative analysis performance during the tandem mass spectrometry. The detailed description will be given hereinafter with reference to FIGS. 1-11.

FIG. 1 shows a preferred mass spectrometer 100 capable of implementing the mass spectrum data acquisition and analysis method according to the present invention. The mass spectrometer 100 includes an ion source 110, an ion focusing device 120, an ion transport device 130, a first-stage mass analyzer 140, a collision cell 150, an orthogonal acceleration reflection time-of-flight mass analyzer 160 and a detector 170.

In a preferred implementation, the mass spectrometer 100 is used in tandem with a chromatograph, wherein the chromatograph may be a liquid chromatograph, a gas chromatograph, a capillary electrophoresis apparatus or the like. The mass spectrum data acquisition and analysis method of the present invention will be described below in detail by taking a LC-MS as example.

An effluent from the liquid chromatograph is fed into the ion source 110 for ionization. As a preferred solution, the ion source 110 is an electrospray ion source. The analyte is ionized, then focused by the ion focusing device 120 and fed into the ion transport device 130. Ions are subsequently fed into the first-stage mass analyzer 140.

As a preferred solution, the first-stage mass analyzer 140 is a mass analyzer based on a quadrupole field, and may be a quadrupole rod, a three-dimensional ion trap, a linear ion trap or the like. The first-stage mass analyzer 140 may operate in a TTI (total transmission ion) mode. That is, ions within a full mass-to-charge ratio section are indiscriminately fed into the collision cell 150 and then transported into a next-stage mass analyzer 160. The first-stage mass analyzer 140 may also operate in an ion selection mode. That is, the ions are discriminately transported into the next-stage mass analyzer 160 by the collision cell 150.

For an analysis task in which the analytes are mainly low-mass ions, for example, the metabonomic analysis, the full mass-to-charge ratio section generally corresponds to a mass-to-charge ratio of 100 to 600. For an analysis task in which the analytes are mainly polypeptides, for example, the proteomic analysis, the full mass-to-charge ratio section generally corresponds to a mass-to-charge ratio of m/z 400 to m/z 1400.

After leaving the first-stage mass analyzer 140, the ions enter the collision cell 150. The collision cell 150 may operate in a low fragmentation mode, a high fragmentation mode or a collision energy scanning mode. When the collision cell 150 operates in the low fragmentation mode, the ions entering the collision cell 150 are not fragmented or less fragmented; when the collision cell 150 operates in the high fragmentation mode, more ions are fragmented; and, when the collision cell operates in the collision energy scanning mode, part of precursor ions are fragmented to obtain product ions, but at least part of precursor ions are not fragmented and thus retained. After leaving the collision cell 150, the ions enter an orthogonal ion acceleration region. The accelerated ions are separated according to the mass-to-charge ratio in the time-of-flight mass analyzer 160, and they then successively enter the detector 170. The detector 170 may record mass spectra of the ions. At this time, a mass spectrum of the ions recorded in the low fragmentation mode is used as a low fragmentation spectrum, a mass spectrum of the ions recorded in the high fragmentation mode is used as a high fragmentation spectrum, and a mass spectrum of the ions recorded in the collision energy scanning mode is used as a mixed spectrum.

As a preferred mass spectrometer capable of implementing the mass spectrum data acquisition and analysis method of the present invention, an ion switching device may be additionally provided in the front of the collision cell, and an ion channel parallel to the collision cell is additionally provided so that the ions may be less fragmented by the parallel ion channel. The ion switching device may guide precursor ions leaving the first-stage mass analyzer into the collision cell or the ion channel parallel to the collision cell.

When a low fragmentation spectrum is to be recorded, the precursor ions are guided into the ion channel parallel to the collision cell; however, when a high fragmentation spectrum is to be recorded, the precursor ions are guided into the collision cell. At this time, the collision cell operates in the high fragmentation mode, so that more precursor ions are fragmented. The mass spectrum data acquisition and acquisition method in the present invention may be respectively implemented on the above two mass spectrometers.

Figure 2:
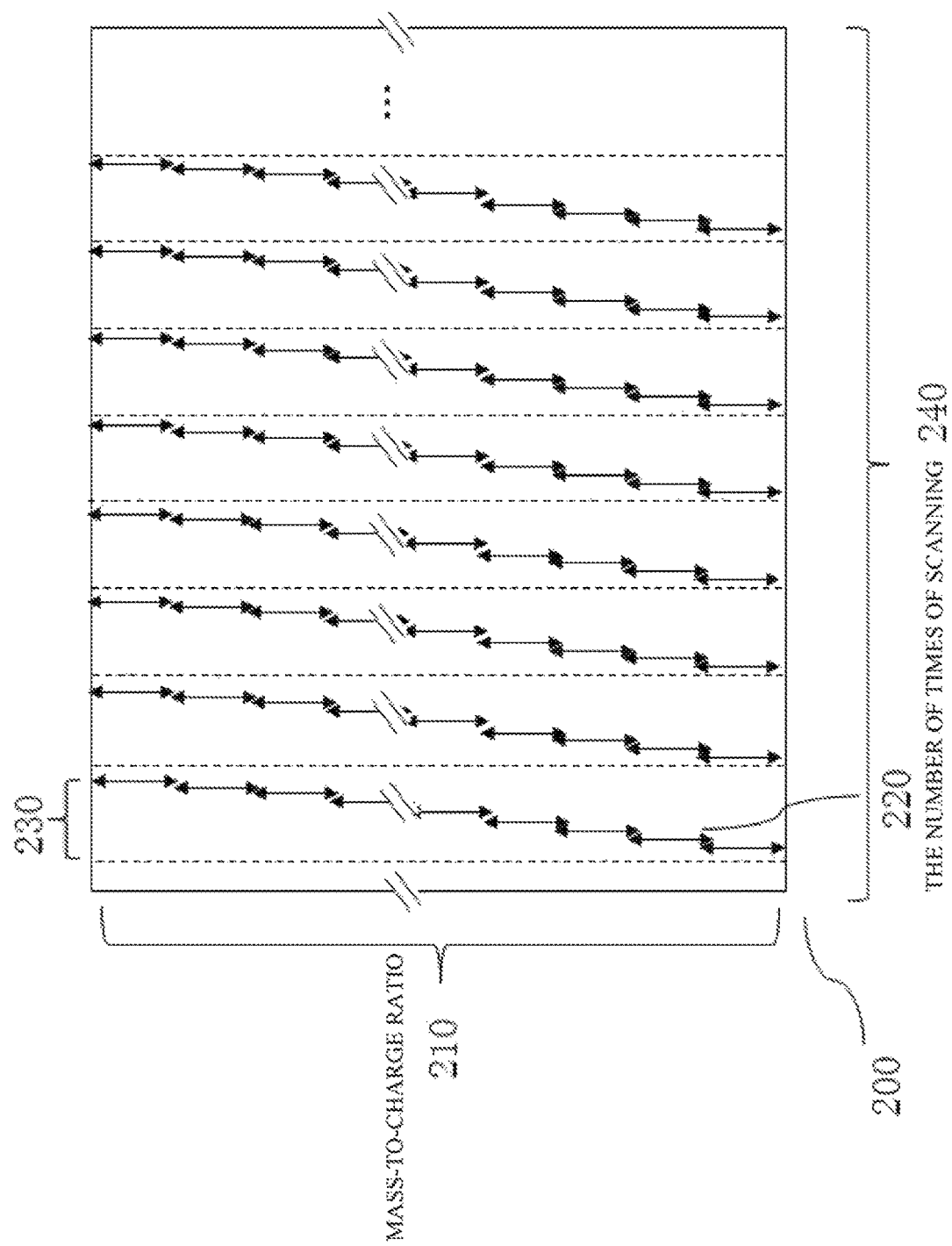
FIG. 2 shows a schematic diagram of a first preferred mass spectrum data acquisition method according to the present invention.

FIG. 2 shows a schematic diagram 200 of a first preferred mass spectrum data acquisition method according to the present invention, where the vertical axis represents the mass-to-charge ratio 210 and the horizontal axis represents the number of times of scanning 240. The first-stage mass analyzer divides the full mass-to-charge ratio section of ions of the analyte into several mass-to-charge ratio windows 220 each having a width not greater than 25 amu, and precursor ion fragmentation and product ion scanning are successively performed for all precursor ions in each window. Several times of product ion scanning form a scanning cycle 230. During the chromatographic elution time, product ions of the precursor ions of the analyte may be evenly acquired for multiple times. Each acquisition corresponds to a chromatographic point, and intensity values of the product ions at different chromatographic points form an ion current chromatogram. The ion current chromatogram may be used for assisting qualitative/quantitative analysis. For small molecule analysis tasks such as metabolite analysis, environmental pollutant analysis and pesticide residue analysis, the full mass-to-charge ratio section generally ranges from m/z 100 to m/z 600; while for the analysis of polypeptides in proteomics, the full mass-to-charge ratio section generally ranges from m/z 400 to m/z 1200. In order to fragment part of precursor ions to obtain product ions while retaining at least part of precursor ions without fragmentation, as a preferred solution, during the implementation of this method, the collision cell is in the collision energy scanning mode during the acquisition of a product ion mass spectrum. Generally, the scanning is performed at collision energy of 0 eV to 50 eV, and the scanning mode may be scanning from high to low or scanning from low to high.

Figure 3:
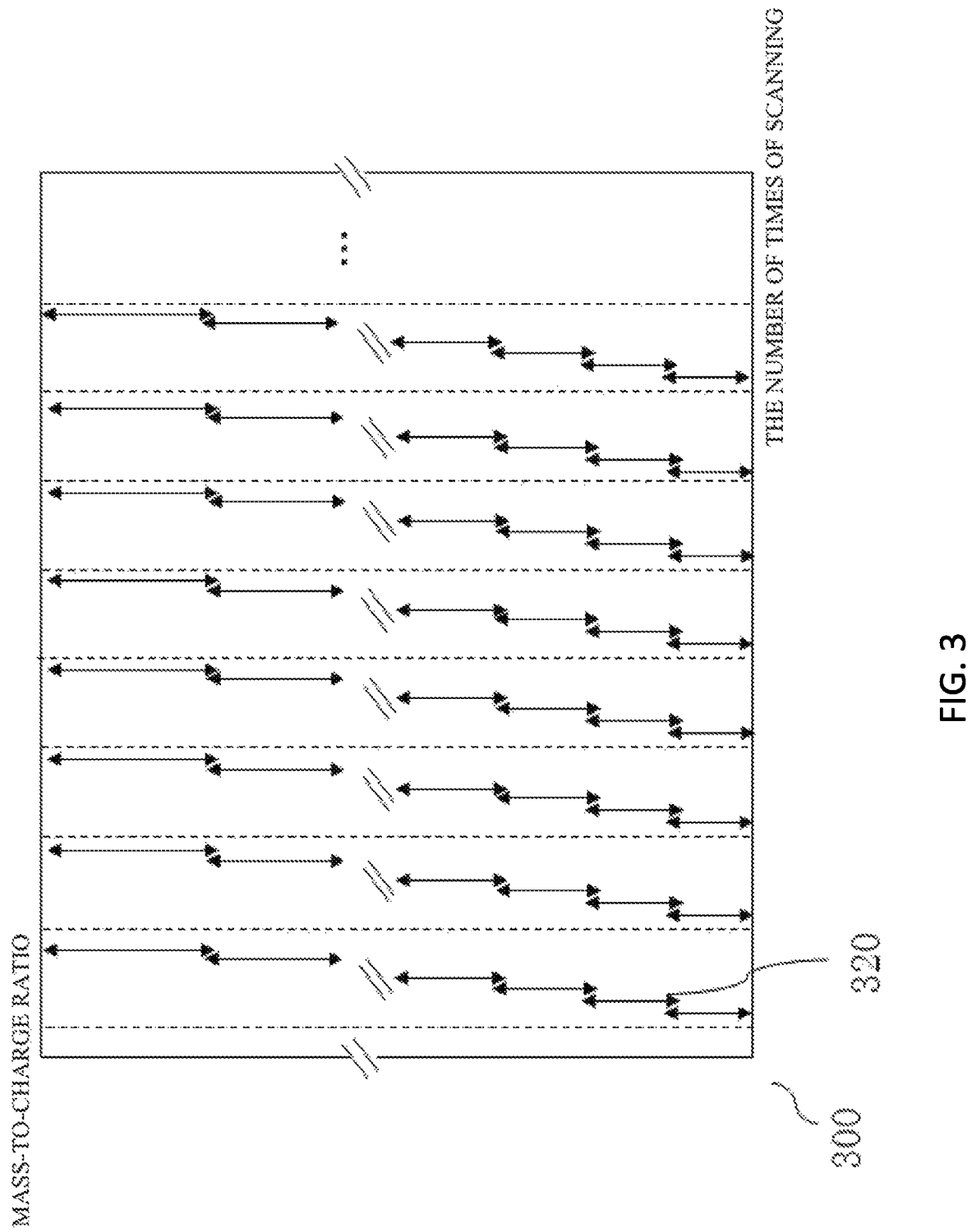
FIG. 3 shows a schematic diagram of a second preferred mass spectrum data acquisition method according to the present invention.

FIG. 3 shows a schematic diagram 300 of a second preferred mass spectrum data acquisition method according to the present invention, where the size of the mass-to-charge ratio window is variable within the full mass-to-charge ratio interval. During the chromatography-mass spectrometry analysis, the number of ions within a small mass range is higher than the number of ions within a large mass range. In order to reduce the number of times of product ion scanning in a cycle, as the mass-to-charge ratio windows 320, small mass-to-charge ratio windows are used within the small mass-to-charge ratio range, while large mass-to-charge ratio windows are used within the large mass-to-charge ratio range. In order to fragment part of precursor ions to obtain product ions while retaining at least part of precursor ions without fragmentation, as a preferred solution, during the implementation of this method, the collision cell is in the collision energy scanning mode during the acquisition of a product ion mass spectrum. Generally, the scanning is performed at a collision energy of 0 eV to 50 eV, and the scanning mode may be scanning from high to low or scanning from low to high.

Figure 4:
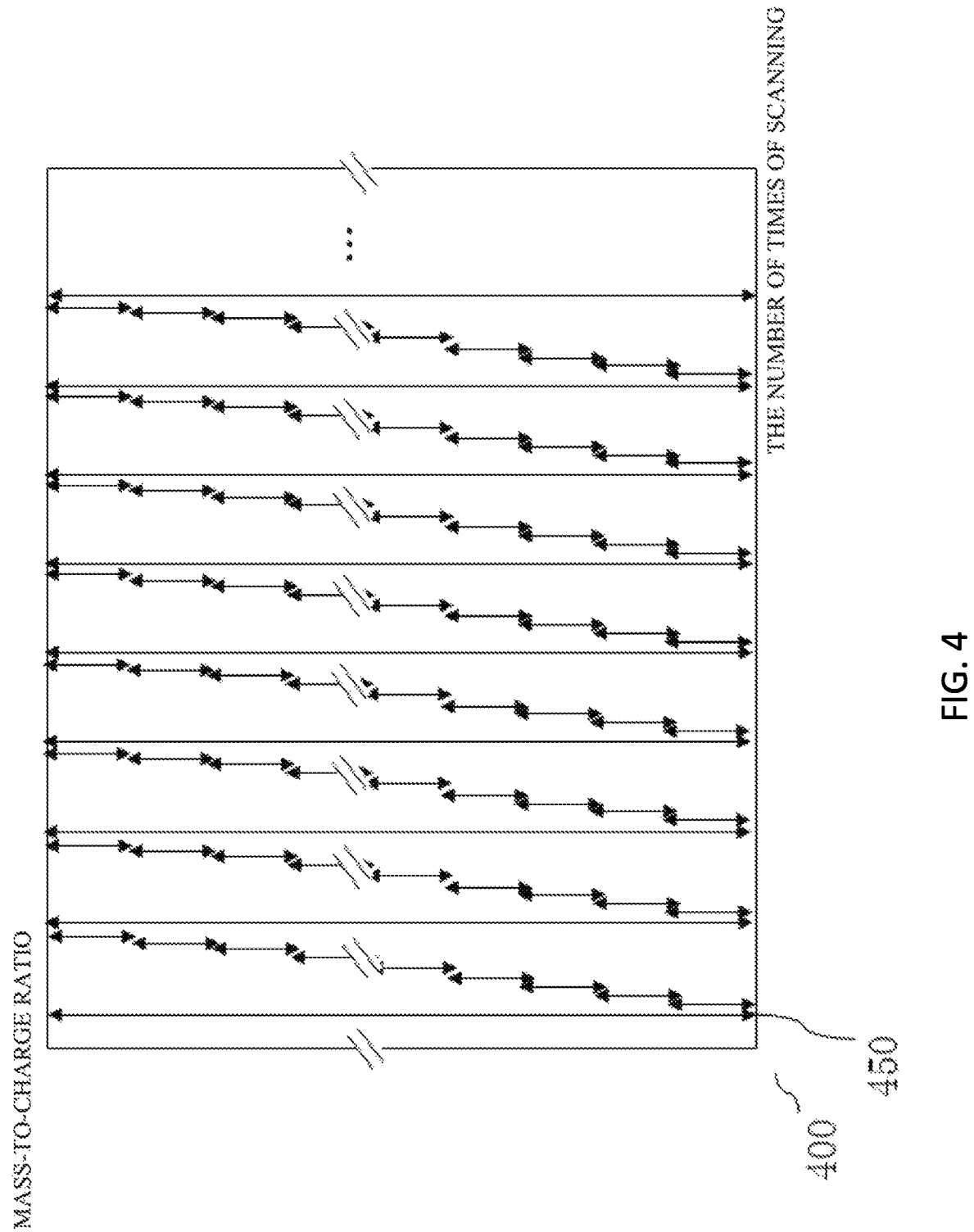
FIG. 4 shows a schematic diagram of a third preferred mass spectrum data acquisition method according to the present invention.

FIG. 4 shows a schematic diagram 400 of a third preferred mass spectrum data acquisition method according to the present invention. This mass spectrum data acquisition method is similar to the data acquisition method 200 shown in FIG. 2, except for a difference that one precursor ion scanning 450 is additionally provided in one scanning cycle. Additional precursor ion mass-to-charge ratio information can be obtained by the precursor ion scanning 450. The additional precursor ion mass-to-charge ratio information may be compared with the precursor ion mass-to-charge ratio information in the product ion mass spectrum to further determine the mass-to-charge ratio of the precursor ions. During the precursor ion scanning 450, the precursor ions are not fragmented or less fragmented.

Figure 5:
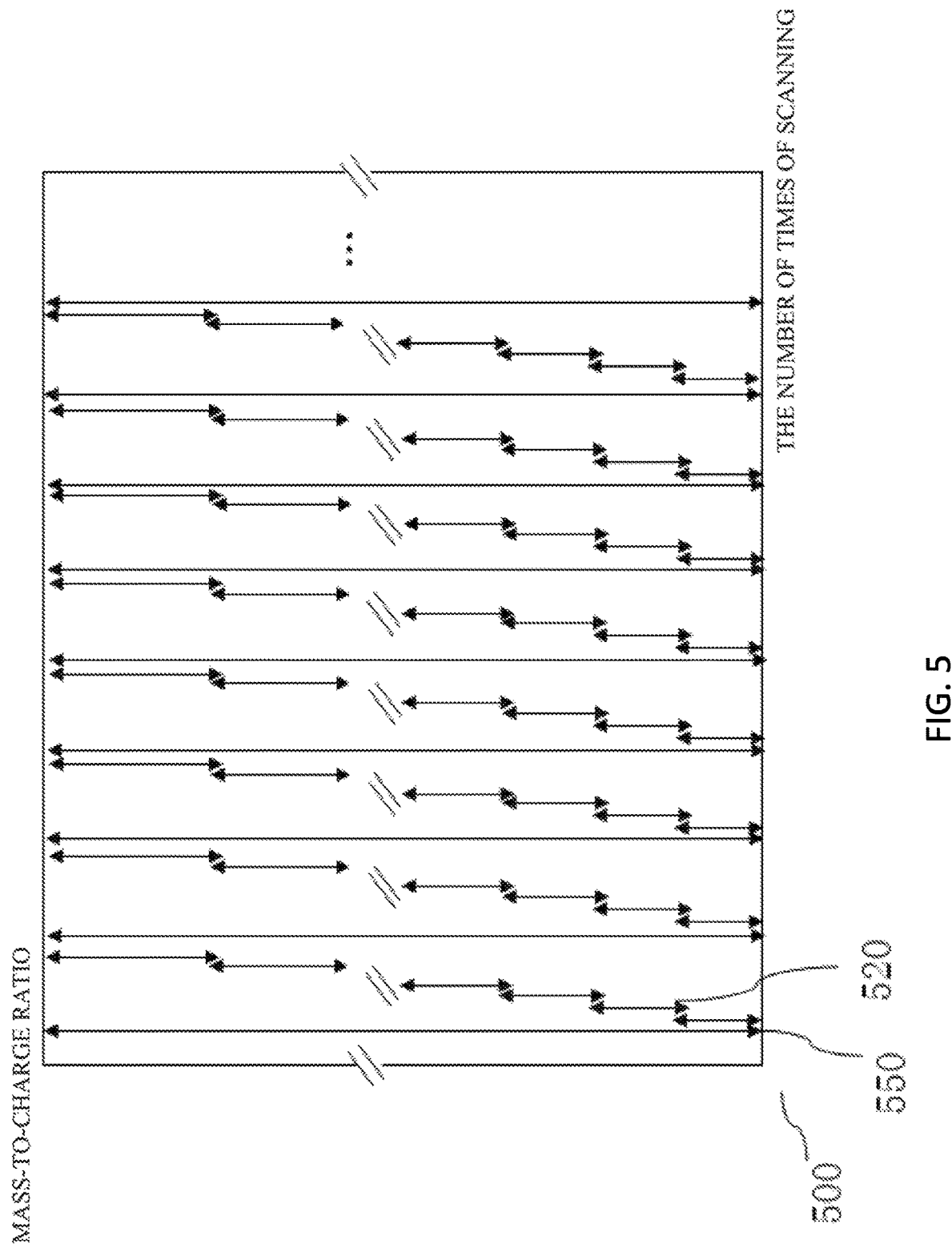
FIG. 5 shows a schematic diagram of a fourth preferred mass spectrum data acquisition method according to the present invention.

FIG. 5 shows a schematic diagram 500 of a fourth preferred mass spectrum data acquisition method according to the present invention. This mass spectrum data acquisition method is similar to the data acquisition method 300 shown in FIG. 3, except for a difference that one precursor ion scanning 550 is additionally provided in one scanning cycle. Additional precursor ion mass-to-charge ratio information can be obtained by the precursor ion scanning 550. The additional precursor ion mass-to-charge ratio information may be compared with the precursor ion mass-to-charge ratio information in the product ion mass spectrum to further determine the mass-to-charge ratio of the precursor ions. During the precursor ion scanning 550, the precursor ions are not fragmented or less fragmented.

Figure 6:
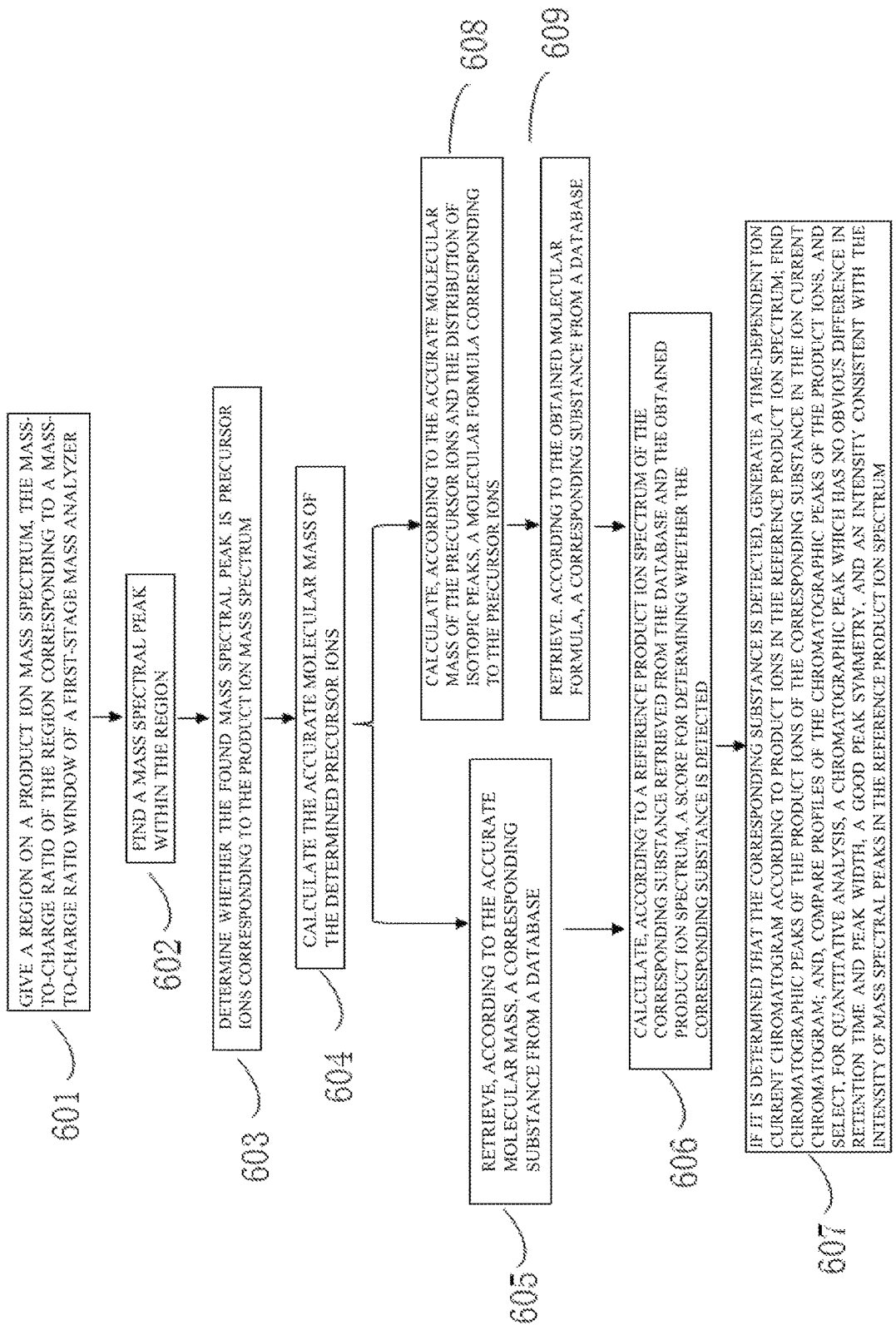
FIG. 6 shows a flowchart of a preferred data analysis method matched with the mass spectrum data acquisition method shown in FIGS. 1 to 5.

FIG. 6 shows a flowchart of a preferred data analysis method matched with the mass spectrum data acquisition method shown in FIGS. 1 to 5. The method includes the following steps.

601: A region is given on a product ion mass spectrum, the mass-to-charge ratio of this region corresponding to a mass-to-charge ratio window of a first-stage mass analyzer of a mass spectrometer during the acquisition of this spectrum.

602: A mass spectral peak is found within the given region.

603: whether the found mass spectral peak is precursor ions corresponding to the product ion mass spectrum is determined.

604: The accurate molecular mass of the determined precursor ions is calculated.

605: A corresponding substance is retrieved from a database according to the accurate molecular mass.

606: A score for determining whether the corresponding substance is detected is calculated according to a product ion spectrum of the corresponding substance retrieved from the database and the obtained product ion spectrum.

607: If the database does not contain the product ion spectrum of the corresponding substance, a product ion spectrum of this substance may be generated by theoretical calculation. If it is determined that the corresponding substance is detected, a time-dependent ion current chromatogram is generated according to product ions in the product ion spectrum of the corresponding substance; then, chromatographic peaks corresponding to the product ions in the ion current chromatogram are found; and, profiles of the product ion chromatographic peaks are compared, and a chromatographic peak, which has no obvious difference in retention time and peak width, a good peak symmetry and an intensity of the chromatographic peaks consistent with the intensity of mass spectral peaks in the product ion spectrum of the corresponding substance, is selected for quantitative analysis.

Concurrently with the step 605, the method further includes a step 608 of calculating a corresponding molecular formula according to the accurate molecular mass and the distribution of isotopic peaks, and a step 609 of searching for, according to the obtained molecular formula, a corresponding substance in a database.

The step 603 is a key step for distinguishing the data-independent acquisition and analysis method disclosed by the present invention from the prior art. This step is aimed at acquiring, from the obtained product ion mass spectrum, information about precursor ions corresponding to this spectrum. When the number of charges carried by the ions corresponding to the ion peaks within the obtained mass-to-charge ratio window is 1 and when the width of the mass-to-charge ratio window corresponding to the product ion mass spectrum is less than 17 amu, the ions corresponding to the ion peaks within the obtained mass-to-charge ratio window are regarded as precursor ions. More generally, charge deconvolution is performed on the ion peaks in the obtained product ion spectrum within the corresponding mass-to-charge ratio window to obtain the accurate mass of ions corresponding to the ion peaks; then, a difference in mass between the ions corresponding to the ion peaks is calculated; it is determined, based on the difference in mass, whether ions having a small mass are generated from ions having a large mass due to neutral loss; and, the ions generated due to the neutral loss are removed, and the remaining ions are used as precursor ions corresponding to the obtained product ion mass spectrum. When the number of charges carried by the ions corresponding to the ion peaks within the obtained mass-to-charge ratio window is 1 and when the width of the mass-to-charge ratio window corresponding to the product ion mass spectrum is greater than 17 amu but less than 26 amu, molecular fragments corresponding to the neutral loss to be determined are only $H_2O$ and $NH_3$.

The score in the step 606 is used for determining whether the substance retrieved from the database is detected, and the variables used for calculating the score include, but are not limited to, the mass-to-charge ratio of ion peaks, the isotopic abundance ratio, the chromatographic retention time, and the relative intensity between peaks.

Figure 7B:
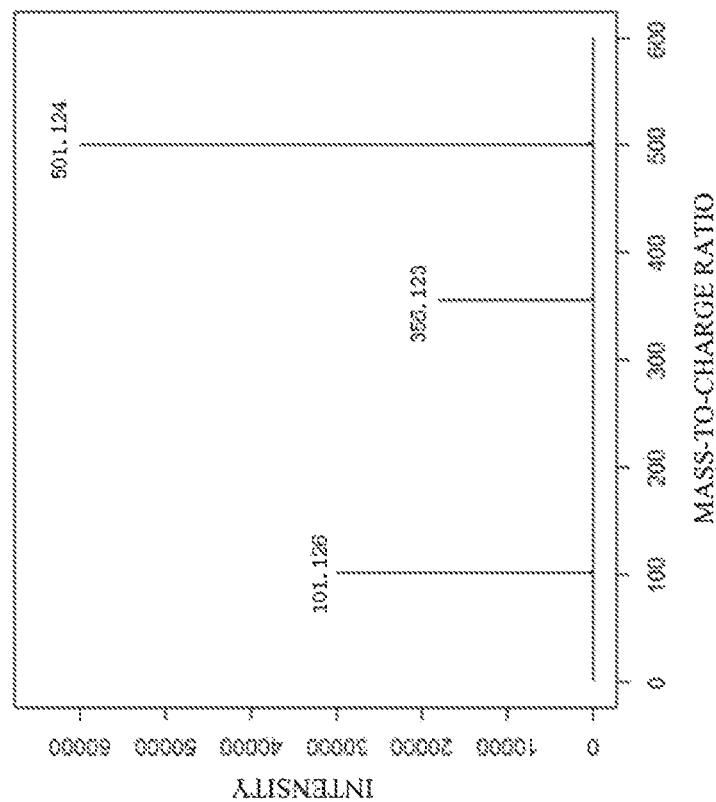
FIGS. 7A-7B show a mixed product ion mass spectrum obtained by the mass spectrum data acquisition method of the present invention and a standard product ion mass spectrum retrieved from a database, according to an embodiment.
Figure 7A:
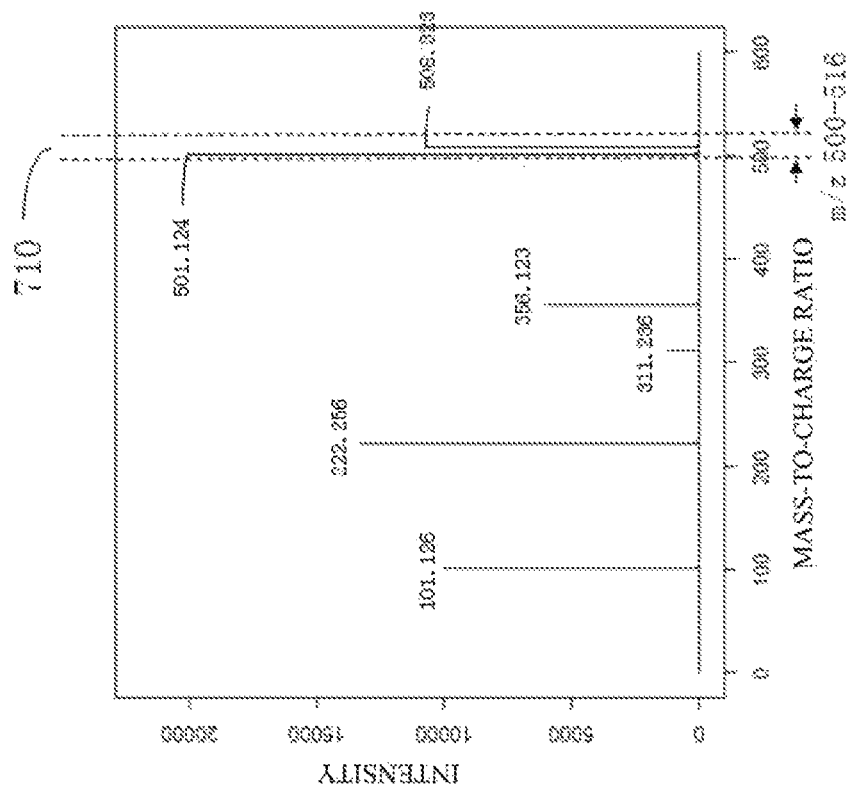

FIGS. 7A and 7B show a mixed product ion mass spectrum obtained by the mass spectrum data acquisition method of the present invention and a standard product ion mass spectrum retrieved from a database, according to an embodiment. The precursor ion mass-to-charge ratio section 710 corresponding to the mixed product ion mass spectrum shown in FIG. 7A ranges from m/z 500 to m/z 516, two potential quasi-molecular ion peaks within this section in this spectrum are m/z 501.124 and m/z 508.323, and the distance between their isotopic peaks is 1 Da. It is indicated that the number of charges carried by ions corresponding to the quasi-molecular ion peaks is 1. Since the width of the mass-to-charge ratio section is 16 Da, which is less than the mass of 17 Da of the minimum neutral fragment $NH_3$ lost from the charged molecules, the quasi-molecular ion peaks are regarded as precursor ions corresponding to the mixed product ion mass spectrum. The accurate molecular mass of the mass spectral peak at the mass-to-charge ratio of m/z 501.124 is used for retrieving a substance from a database, or for calculating a molecular formula and then retrieving a substance from a database. The retrieved substance is observed and then a standard product ion mass spectrum of this substance is obtained (FIG. 7B). It can be found from the comparison of FIG. 7A and FIG. 7B that two product ions (m/z 101.12 and m/z 356.123) in the standard product ion mass spectrum also appear in the mixed spectrum, and the abundance ratio of the two product ions is similar in both the mixed spectrum and the standard product ion mass spectrum. In the standard product ion mass spectrum, a higher score will be obtained, which indicates that the substance corresponding to the standard spectrum is detected in the obtained mixed product ion mass spectrum. It is to be noted that two other product ions (m/z 222.256 and m/z 311.236) in the mixed spectrum shown in FIG. 7A may be generated by fragmenting the precursor ion m/z 508.323.

Figure 8:
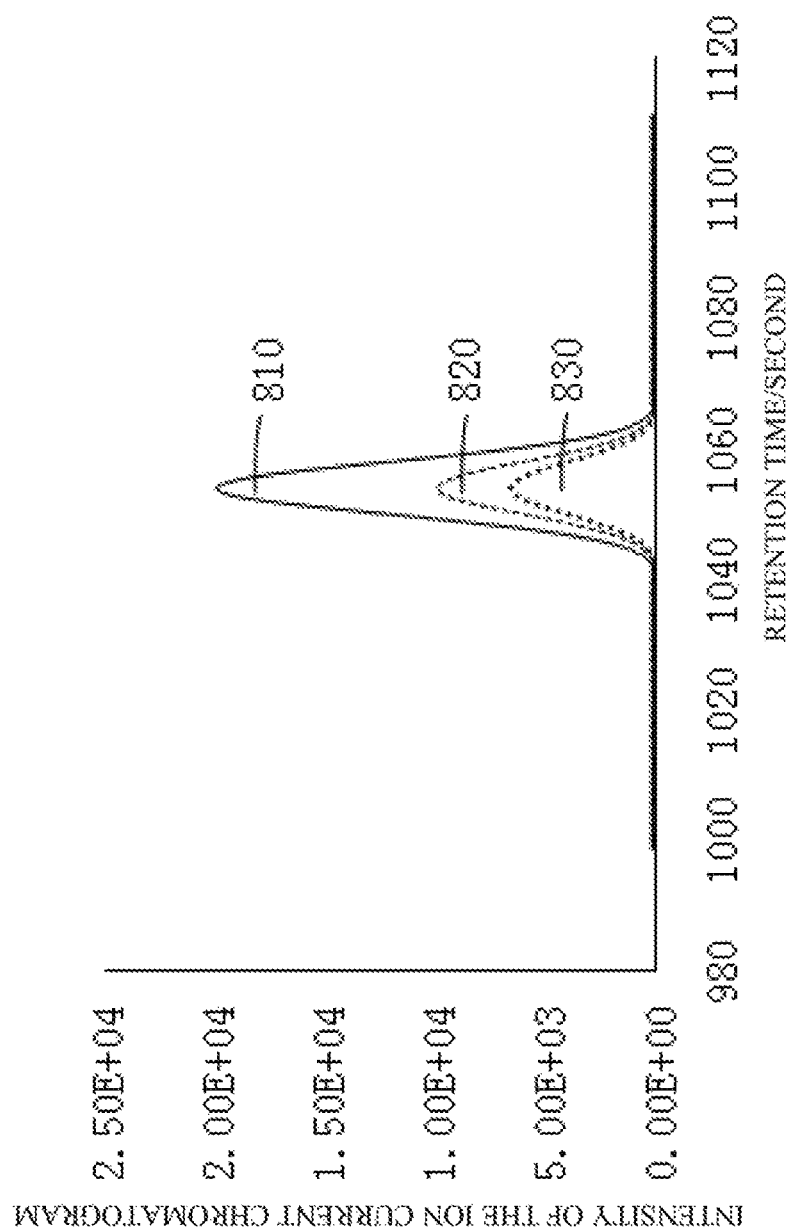
FIG. 8 shows ion current chromatograms corresponding to the ion peaks shown in FIG. 7B.

FIG. 8 shows ion current chromatograms of ion peaks in the product ion mass spectrum shown in FIG. 7B. An ion current chromatogram 810 of a precursor ion 501.124, an ion current chromatogram 820 of a product ion m/z 101.126 and an ion current chromatogram of a product ion m/z 356.123 are successively shown from up to down. The relative intensity between the ion current chromatograms shown in FIG. 8 is similar to the relative intensity between the ion peaks shown in FIG. 7B, the peaks are symmetrical in shape, and there are no obvious interference peaks. In this case, the intensity or peak area of any ion current chromatogram may be selected as a reference value for quantitative analysis. When there are interference peaks in the ion current chromatograms, the intensity or peak area of a product ion current chromatogram having minimum interference, a highest signal-to-noise ratio and symmetrical peaks is preferentially selected as a reference for quantitative analysis.

Figure 9:
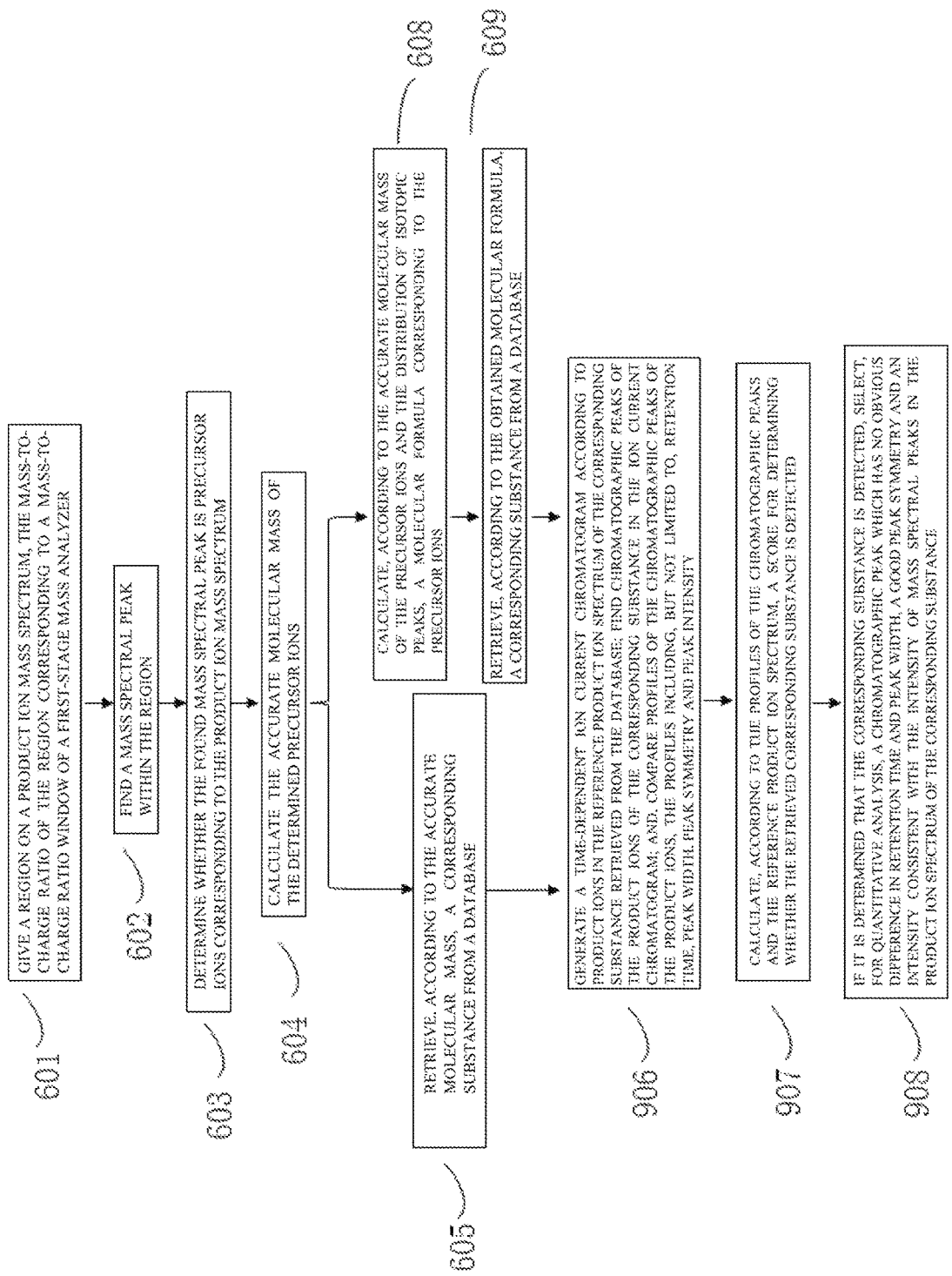
FIG. 9 shows a flowchart of another preferred data analysis method matched with the mass spectrum data acquisition method shown in FIGS. 1 to 5.

FIG. 9 shows a flowchart of another preferred data analysis method matched with the mass spectrum data acquisition method shown in FIGS. 1 to 5. This method is similar to the data processing method shown in FIG. 6, except for a difference in the score calculation and determination after the retrieval from the database. In the method shown in FIG. 9, the score calculation and determination is implemented in two steps. Firstly, in the step 906, a time-dependent ion current chromatogram is generated according to product ions in the product ion spectrum of the corresponding substance retrieved from the database, chromatographic peaks of the product ions of the corresponding substance in the ion current chromatogram are found, and profiles of the chromatographic peaks of the product ions are compared in terms of the retention time, peak width, peak symmetry and peak intensity; and then, in the step 907, a score is calculated according to the profiles of the chromatographic peaks of the product ions and the product ion spectrum of the corresponding substance, to determine whether the retrieved corresponding substance is detected. In the step 908, if it is determined that the corresponding substance is detected, a chromatographic peak, which has no obvious difference in retention time and peak width, a good peak symmetry and an intensity of the chromatographic peaks consistent with the intensity of mass spectral peaks in the product ion spectrum of the retrieved corresponding substance, is selected for quantitative analysis.

Figures 10A, 10B:
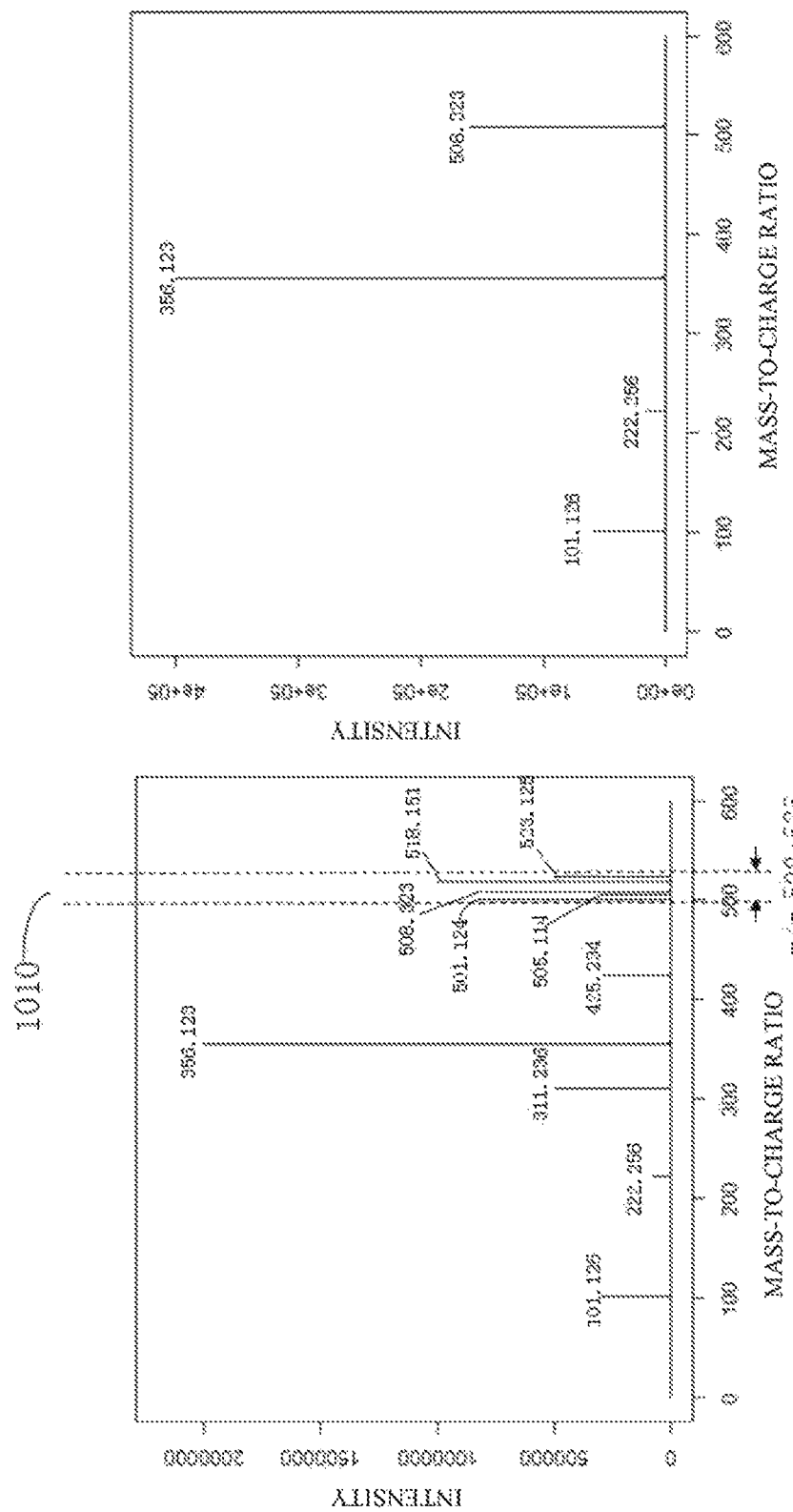
FIGS. 10A-10B show a mixed product ion mass spectrum obtained by the mass spectrum data acquisition method of the present invention and a standard product ion mass spectrum retrieved from a database, according to another embodiment.

FIGS. 10A and 10B show a mixed product ion mass spectrum obtained by the mass spectrum data acquisition method of the present invention and a standard product ion mass spectrum retrieved from a database in another example. The precursor ion mass-to-charge ratio section 1010 corresponding to the mixed product ion mass spectrum shown in FIG. 10A ranges from m/z 500 to m/z 525, five potential quasi-molecular ion peaks within this section in this spectrum are m/z 501.124, m/z 505.114, m/z 508.323, m/z 518.151 and m/z 523.125, and the distance between their isotopic peaks is 1 Da. It is indicated that the number of charges carried by ions corresponding to the quasi-molecular ion peaks is 1. Since the width of the mass-to-charge ratio section is greater than 17 Da but less than 26 Da, possible neutral fragments lost from the charged molecules are $NH_3$ and $H_2O$, and their accurate masses are 17.026 Da and 18.010 Da, respectively. Since the difference in mass-to-charge ratio between the ion peaks m/z 501.124 and m/z 518.151 is 17.027 Da, which differs 0.001 Da from the accurate mass of $NH_3$, it is considered that the ion peak m/z 501.124 is generated from the ion peak m/z 518.151 after losing the neutral fragment $NH_3$. Similarly, it can be inferred that the ion peak m/z 505.114 is generated from the ion peak m/z 523.125 after losing the neutral fragment $H_2O$. So far, only three mass spectral peaks m/z 508.323, m/z 518.151 and m/z 523.128 among the five potential quasi-molecular ion peaks are determined as quasi-molecular ion peaks, that is, the three mass spectral peaks are precursor ions corresponding to the product ion mass spectrum. The accurate molecular mass of the mass spectral peak at the mass-to-charge ratio of m/z 508.323 is used for retrieving the substance from a database, or for calculating a molecular formula and then retrieving the substance from a database. The retrieved substance is observed and then a standard product ion mass spectrum of this substance is obtained (FIG. 10B).

Figure 11:
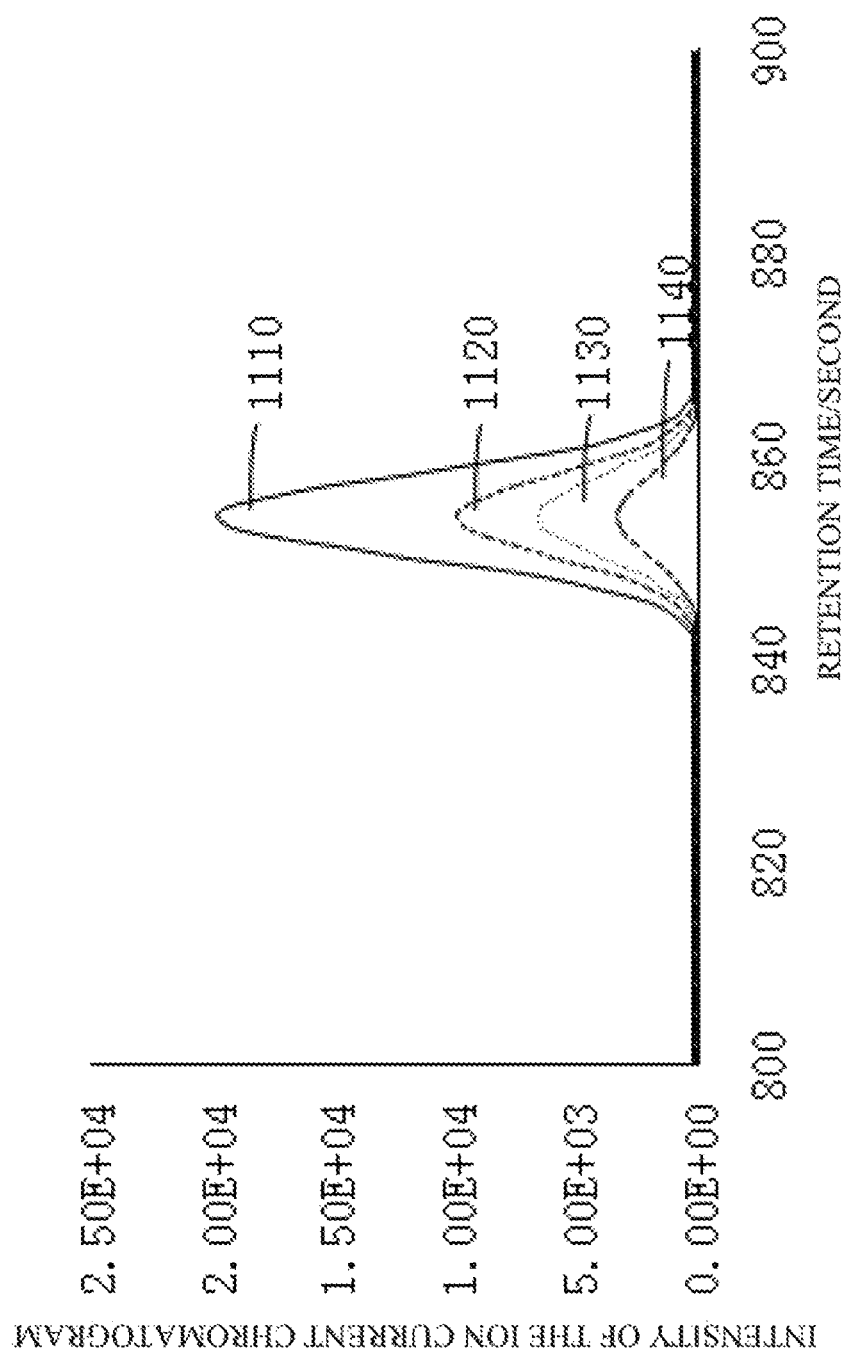
FIG. 11 shows ion current chromatograms corresponding to the ion peaks shown in FIG. 10B.

FIG. 11 shows time-dependent ion current chromatograms according to product ion peaks in the spectrum shown in FIG. 10B. An ion current chromatogram 1110 of a product ion m/z 356.123, an ion current chromatogram 1120 of a precursor ion m/z 508.323, an ion current chromatogram 1130 of a product ion m/z 101.126 and an ion current chromatogram 1140 of a product ion m/z 222.256 are successively shown from up to down. The relative intensity between the product ion current chromatograms shown in FIG. 11 is similar to the relative intensity between the corresponding ion peaks shown in FIG. 10A, the peaks are symmetrical in shape, and there are no obvious interference peaks. A higher score will be obtained for the retrieved substance, which indicates that the substance corresponding to the standard spectrum is detected in the obtained mixed product ion mass spectrum. When the product ion current chromatograms shown in FIG. 11 are symmetrical in peak shape and have no obvious interference peaks and high peak intensity, the intensity value or peak area of any product ion current chromatogram may be used as a reference value for quantitative analysis. However, when there are interference peaks in the ion current chromatograms, the intensity or peak area of a product ion current chromatogram having minimum interference, a highest signal-to-noise ratio and symmetrical peaks is preferentially selected as a reference for quantitative analysis. It is to be noted that since the section for other product ions (e.g., m/z 311.236 and m/z 425.234) in FIG. 10A is not determined, corresponding ion current chromatograms will not be generated for quantitative analysis.

In conclusion, the present invention is applied to the data acquisition and analysis in tandem mass spectrometry combined with liquid chromatography, and the first-stage mass analyzer divides the full mass-to-charge ratio section of ions of an analyte into several mass-to-charge ratio windows. Precursor ion fragmentation and product ion scanning are successively performed for all precursor ions in each window. Several times of product ion scanning form a scanning cycle. The circulation is performed continuously until one liquid chromatographic separation ends. For the obtained mass spectrum data, the following data analysis process is performed: a region is positioned on a product ion mass spectrum, the mass-to-charge ratio of this region corresponding to a mass-to-charge ratio window of a first-stage mass analyzer of a mass spectrometer during the acquisition of this spectrum; a mass spectral peak is searched within the positioned region; it is determined whether the searched mass spectral peak is precursor ions corresponding to the product ion mass spectrum; the accurate molecular mass of the determined precursor ions is calculated; a corresponding substance is retrieved from a database according to the accurate molecular mass; a score for determining whether the corresponding substance is detected is calculated according to a product ion spectrum of the corresponding substance retrieved from the database and the obtained product ion spectrum; and, if the database does not contain a product ion spectrum of the corresponding substance, a product ion spectrum of this substance may be generated by theoretical calculation. If it is determined that the corresponding substance is detected, a time-dependent ion current chromatogram is generated according to product ions in the product ion spectrum of the corresponding substance; then, chromatographic peaks corresponding to the product ions in the ion current chromatogram are searched; and, profiles of the chromatographic peaks of the product ions are compared, and a chromatographic peak, which has no obvious difference in retention time and peak width, a good peak symmetry and an intensity of the chromatographic peaks consistent with the intensity of mass spectral peaks in the product ion spectrum of the corresponding substance, is selected for quantitative analysis. The present invention improves the ion utilization efficiency during the tandem mass spectrometry, significantly improves the qualitative/quantitative analysis performance in comparison to the conventional methods, and effectively overcome various defects in the prior art and thus has a high industrial value in use.

The foregoing embodiments are merely for illustratively describing the principle and effects of the present invention, and not intended to limit the present invention. Those skilled in the art can make modifications or alterations to the embodiments without departing from the spirit and scope of the present invention. Therefore, all equivalent modifications or alterations made by those skilled in the art without departing from the spirit and technical concept of the present invention shall be embraced by the claims of the present invention.

The invention claimed is:

1. A mass spectrum data acquisition and analysis method, comprising the steps of:
   providing at least one ion source for generating ions, the generated ions containing ions of a substance to be analyzed;
   dividing a full mass-to-charge ratio range of the ions of the substance to be analyzed into sub mass-to-charge ratio ranges, feeding ions within each of the sub mass-to-charge ratio ranges in sequence into a collision cell to fragment at least part of the ions, and respectively recording mass spectra of the ions passing through the collision cell as product ion spectra;
   searching for ion peaks within a mass-to-charge ratio window set in each of the product ion spectra, a range of the mass-to-charge ratio window being the same as a corresponding one of the sub mass-to-charge ratio ranges; and
   determining ions corresponding to the ion peaks as precursor ions corresponding to one of the product ion spectra, wherein the determining step comprises:
      determining a width of the mass-to-charge ratio window and a number of charges carried by the ions corresponding to the ion peaks; and
      determining the ions corresponding to the ion peaks as the precursor ions when the width of the mass-tocharge ratio window is less than 17 amu and the number of charges carried by the ions corresponding to the ion peaks is 1.

2. The method according to claim 1, further comprising:
in one process of recording the product ion spectrum, changing collision energy of the collision cell within a set range.

3. The method according to claim 2, wherein the change is a change from low to high or a change from high to low.

4. The method according to claim 1, wherein the sub mass-to-charge ratio ranges are continuously distributed and cover the full mass-to-charge ratio range of the ions of the substance to be analyzed.

5. The method according to claim 4, wherein there is an overlap of 1 amu between two adjacent sub mass-to-charge ratio ranges.

6. A mass spectrum data acquisition and analysis method, comprising the steps of:
providing at least one ion source for generating ions, the generated ions containing ions of a substance to be analyzed;
dividing a full mass-to-charge ratio range of the ions of the substance to be analyzed into sub mass-to-charge ratio ranges, feeding ions within each of the sub mass-to-charge ratio ranges in sequence into a collision cell to fragment at least part of the ions, and respectively recording mass spectra of the ions passing through the collision cell as product ion spectra;
searching for ion peaks within a mass-to-charge ratio window set in each of the product ion spectra, a range of the mass-to-charge ratio window being the same as a corresponding one of the sub mass-to-charge ratio ranges; and
determining ions corresponding to the ion peaks as precursor ions corresponding to one of the product ion spectra, wherein the determining step comprises:
performing charge deconvolution on the ion peaks to obtain a mass of the ions corresponding to the ion peaks;
calculating a difference in mass between the ions corresponding to the ion peaks, and determining, based on the difference in mass, whether ions having a mass less than a first threshold are generated from ions having a mass greater than a second threshold due to a neutral loss; and
removing the ions generated by the neutral loss, and using the remaining ions as the precursor ions corresponding to the product ion spectra.

7. The method according to claim 6, wherein the determining step further comprises:
determining a width of the mass-to-charge ratio window and a number of charges carried by the ions corresponding to the ion peaks; and
determining molecular fragments corresponding to the neutral loss are $H_2O$ and $NH_3$ when the width of the mass-to-charge ratio window is greater than 17 amu but less than 26 amu and the number of charges carried by the ions corresponding to the ion peaks in the mass-to-charge ratio window is 1.

8. The method according to claim 6, further comprising the step of searching for, according to a mass-to-charge ratio of the determined precursor ions, a corresponding substance in a preset database.

9. The method according to claim 8, further comprising the step of calculating, according to a reference product ion spectrum of the corresponding substance in the preset database and the product ion spectrum recorded by a mass spectrometer, a score for further determining whether the corresponding substance is detected.

10. The method according to claim 9, further comprising the steps of:
when it is determined that the corresponding substance is detected, generating a time-dependent ion current chromatogram according to product ions in the reference product ion spectrum;
obtaining chromatographic peaks of product ions of the corresponding substance in the ion current chromatogram; and
comparing profiles of the product ion chromatographic peaks, and selecting, for quantitative analysis, a chromatographic peak which has a difference less than a third threshold in retention time and peak width, a peak symmetry higher than a fourth threshold, and an intensity of the chromatographic peaks consistent with the intensity of mass spectral peaks in the product ion spectrum of the corresponding substance.

11. The method according to claim 8, further comprising the steps of:
generating a time-dependent ion current chromatogram according to product ions in the product ion spectrum of the corresponding substance in the preset database;
obtaining product ion chromatographic peaks of the corresponding substance in the ion current chromatogram; and
comparing profiles of the product ion chromatographic peaks, the profiles including, but not limited to, retention time, peak width, peak symmetry and peak intensity.

12. The method according to claim 11, further comprising the step of calculating, according to the profiles of the chromatographic peaks of the product ions and the reference product ion spectrum of the corresponding substance in the preset database, a score for determining whether the corresponding substance is detected.

13. The method according to claim 12, further comprising the step of: when it is determined that the corresponding substance is detected, selecting, for quantitative analysis, a chromatographic peak which has a difference less than a third threshold in retention time and peak width, a peak symmetry higher than a fourth threshold, and an intensity of the chromatographic peaks consistent with the intensity of mass spectral peaks in the product ion spectrum of the corresponding substance.

14. The method according to claim 6, further comprising the steps of:
calculating, according to a mass-to-charge ratio of the determined precursor ions and an isotopic abundance ratio of the precursor ions, a molecular formula of the precursor ions; and
searching for, according to the calculated molecular formula, a corresponding substance in the preset database.

* * * * *